No. 748,102. PATENTED DEC. 29, 1903.
G. RITTER.
RAIN WATER PURIFIER.
APPLICATION FILED OCT. 7, 1903.
NO MODEL.
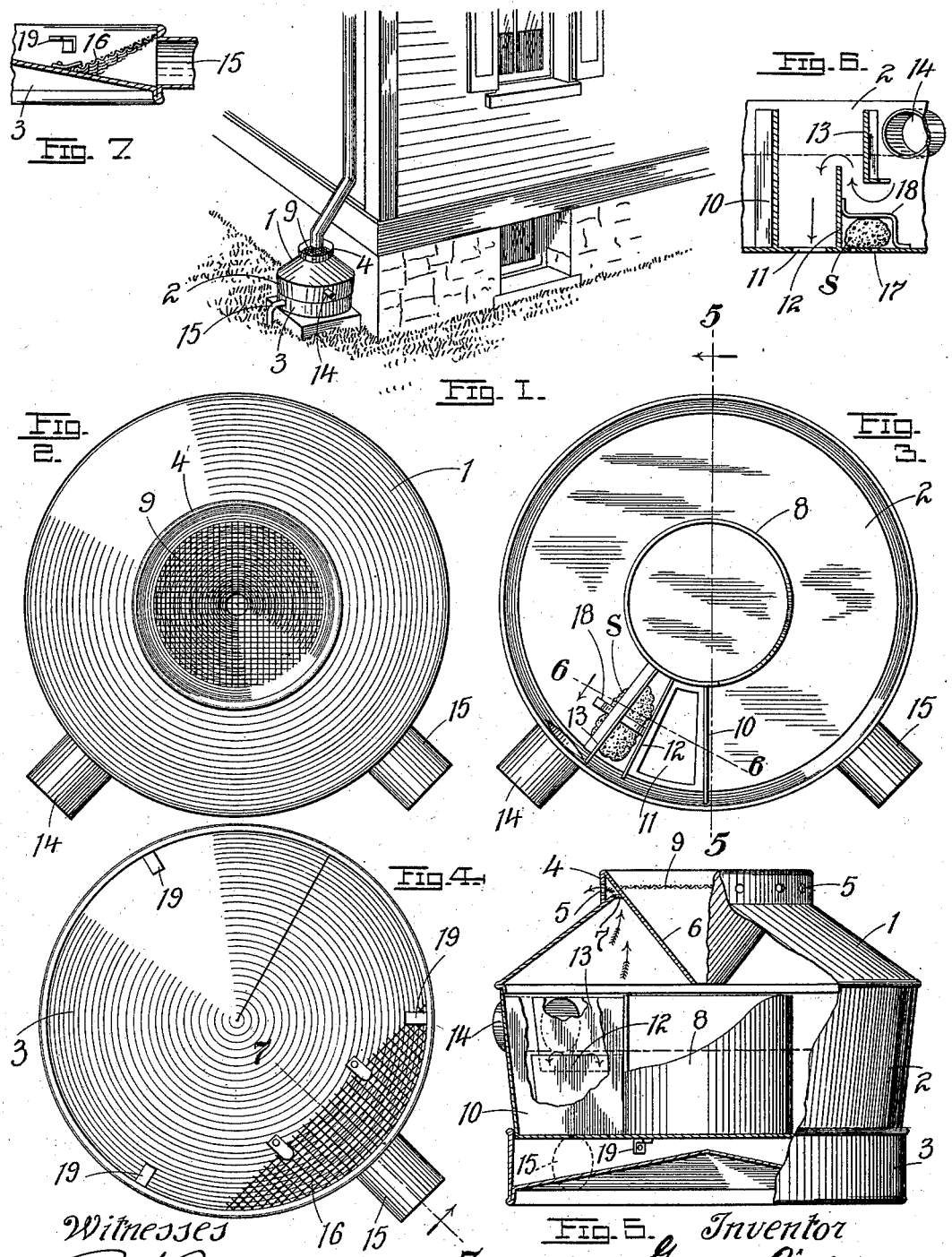

No. 748,102. Patented December 29, 1903.

UNITED STATES PATENT OFFICE.

GEORGE RITTER, OF PINCKNEYVILLE, ILLINOIS.

RAIN-WATER PURIFIER.

SPECIFICATION forming part of Letters Patent No. 748,102, dated December 29, 1903.

Application filed October 7, 1903. Serial No. 176,149. (No model.)

*To all whom it may concern:*

Be it known that I, GEORGE RITTER, a citizen of the United States, residing at Pinckneyville, in the county of Perry and State of Illinois, have invented certain new and useful Improvements in Rain-Water Purifiers, of which the following is a full, clear, and exact description, reference being had to the accompanying drawings, forming part hereof.

My invention has relation to improvements in rain-water purifiers; and it consists in the novel arrangement and combination of parts more fully set forth in the specification and pointed out in the claims.

In the drawings, Figure 1 is a perspective view showing the application of my invention to an ordinary dwelling. Fig. 2 is a top plan view of the device. Fig. 3 is a top plan with the top section removed. Fig. 4 is a top plan of the bottom section. Fig. 5 is a vertical middle section on line 5 5 of Fig. 3. Fig. 6 is a cross-sectional detail on line 6 6 of Fig. 3, and Fig. 7 is a sectional detail on line 7 7 of Fig. 4.

The present device is an improvement on the construction of water-purifier shown and described in United States Letters Patent No. 669,398, issued to me under date of March 5, 1901, and has for its object to materially simplify the patented construction and to eliminate all movable parts and springs which make the patented construction, in a measure, objectionable on account of the increased cost of manufacture. The present device, too, is simpler, cheaper, and having no movable parts is preferable.

In detail the invention may be described as follows:

Referring to the drawings, 1 2 3 represent the respective separable sections of which the present device is composed. The hood or upper section 1 is conical or dome-shaped, being provided with a central circular rim 4, having perforations 5, the rim having secured thereto a depending funnel or conveyer 6, the walls of the latter being suitably spaced from the mouth of the conical portion of the hood, whereby there is left an annular air-space 7 for the free escape of the air therethrough and through the perforations 5. (See arrows in Fig. 5.) Supporting the hood is the middle section or receptacle 2, which has a centrally-disposed cup 8, adapted to receive the water from the funnel 6, (the mouth of the latter being preferably covered by a sheet of wire-netting 9 to keep out the leaves and coarse dirt flowing through the down-spout,) the peripheral wall of said cup having a substantially triangular section thereof removed, so as to discharge, before the cup fills entirely, into the receptacle, the water being prevented from escaping in one direction by the division-wall or partition 10, disposed the full height of the receptacle between the wall of the cup and the wall of the receptacle, the water being thus compelled to seek an outlet through the escape-opening 11 on the opposite side of the partition by passing over the dam 12, the floating particles of dirt—such as soot, bugs, flies, and the like—being first skimmed off by the skimmer-plate 13, whose lower edge is in a plane below that of the upper edge of the dam 12. The overflow from the receptacle escapes through the nozzle or spout 14. The water thus far purified after passing through the escape-opening 11 is delivered to the bottom section or filter-pan 3, having a conical bottom and a discharge-spout 15 above said bottom. It is further provided with a section of filter gauze or netting 16, through which the water must first pass before escaping through the spout 15 into the cistern. Any water that may remain in the receptacle 2 after the rain has ceased is permitted to percolate through a sponge S and perforations 17, Figs. 3 and 6, into the bottom section or filter-pan, the sponge being retained in position by a clip or spring-plate 18, secured to the dam. The sponge intercepts any dirt and solid particles and may be cleaned from time to time.

The middle section is supported on lips 19, carried by the pan 3, and the top section or hood 1 may be turned so as to discharge the overflow in any desirable direction. The several sections are supported one by the other and can be taken apart at a moment's notice and cleaned. Obviously the walls 12 and 13, like the wall 10, are disposed across the space between the cup 8 and the outer wall of the receptacle 2. Obviously the upper edge of the dam 12 is below that of the partition-wall 10.

It is to be understood that I may depart from the details here shown without in anywise affecting the nature or spirit of my invention.

Having described my invention, what I claim is—

1. In a rain-water purifier, a suitable receptacle, a cup carried thereby, a hood mounted over the receptacle, a conveyer on the hood for delivering the water to the cup, a skimmer-plate and dam in the path of the water, a partition-wall formed between the cup and wall of the receptacle, the latter having an escape-opening located adjacent to the wall and dam, substantially as set forth.

2. In a rain-water purifier, a suitable receptacle, a bottom filter-pan communicating therewith, a conical hood or cover for the receptacle, a terminal rim surmounting the conical walls of the hood, a funnel conveyer depending from the upper edge of the rim and having its walls suitably removed from the walls of the opening about which the rim is disposed, the latter being provided with a series of perforations for the escape of air, substantially as set forth.

3. In a rain-water purifier, a suitable receptacle having a central cup or receiver, a section of the peripheral wall thereof being removed for a portion of its depth, a partition-wall spanning the space between the cup and outer walls of the receptacle for the full depth of the latter, a dam located adjacent to the partition but removed a suitable distance therefrom and having its upper edge in a plane relatively below the upper edge of the partition-wall, an escape-opening being located between the dam and partition-wall, at the bottom of the receptacle, and a skimmer-plate located adjacent to the dam and having its lower edge below that of the upper edge of the dam, substantially as set forth.

4. In a rain-water purifier, having a main receptacle and a bottom filter-pan, means for delivering the water to the receptacle, a skimmer-plate and dam in said receptacle, the bottom of the receptacle having perforations leading to the filter-pan, and means for holding a sponge or similar absorbent over the perforations for draining the contents of the receptacle and at the same time intercepting the dirt and foreign material, substantially as set forth.

5. A rain-water purifier composed of three communicating sections, viz, a hood or upper section, a receptacle or middle section, and a filter-pan or bottom section, the sections being separable and adjustable in any direction the bottom section being provided with a suitable discharge-spout adapted to deliver the water to a cistern, and the middle section or receptacle having an overflow-nozzle and adapted to be angularly adjusted to permit the nozzle to discharge in any direction, substantially as set forth.

In testimony whereof I affix my signature in presence of two witnesses.

GEORGE RITTER.

Witnesses:
EMIL STAREK,
G. L. BELFRY.